Patented Aug. 30, 1949

2,480,184

UNITED STATES PATENT OFFICE 2,480,184

BENEFICIATION OF ORES BY THE REMOVAL OF IRON

Hendrik deW. Erasmus, Lewiston, N. Y., assignor, by mesne assignments, to Union Carbide and Carbon Corporation, a corporation of New York No Drawing. Application July 8, 1947, Serial No. 759,702

7 Claims. (Cl. 75—1)

The invention relates to the beneficiation of ores and related materials by chloridization and provides a method of removing undesirable metal values therefrom.

Broadly, the method of the invention comprises treating a mixture of an ore and an anhydrous alkaline earth chloride at elevated temperatures and reduced pressure to effect a chlorine exchange and volatilization of the metal chlorides to be removed.

The invention is particularly advantageous for the beneficiation of chromite ore; that is, improving the ratio of the chromium content to the iron content of the ore. In the manufacture of commercial ferrochromium, it is important that the chromium to iron ratio be at least three and preferably even higher. Inasmuch as most domestic chromite ore falls below the required ratio only high-grade foreign ores have found extensive use in ferrochromium manufacture.

Many methods have been proposed for beneficiating chromium ores. For example, the iron oxide in the ore may be reduced with an agent, such as coal, and the resulting metallic iron removed by acid leaching. Other proposals include treatment of the ore with chlorine and carbon or carbon monoxide at elevated temperatures to effect volatilization of iron chloride.

An object of the present invention is to provide a novel and economic chloridization procedure whereby the chromium to iron ratio in low-grade chromite ore and other chromium materials may be improved.

Another object is to provide a process whereby it is possible to produce in a low-grade chromium ore a higher chromium to iron ratio than occurs in high-grade ores.

A further object is to provide a method wherein the iron removed in the beneficiation of chromium ore is recovered as a commercially usable product, and the alkaline earth chloride regenerated and recycled.

In practicing the invention by beneficiating low-grade chromium ore, the ore is comminuted to 200 mesh size (0.0029 in. openings) or finer and mixed with anhydrous calcium chloride. Comminuted silica should be added, if the ore contains insufficient silica or other acidic oxide to react with the lime formed in the reaction between calcium chloride and the iron oxide of the ore. To assure ready escape of volatile products and complete reaction, it is advisable to briquette or pellet the mixture. The mixture is then charged into a vacuum type furnace equipped with a suitable condenser and heated at a temperature between 1000° C. and 1200° C. at a pressure of less than 10 mm. of mercury absolute for a period of time sufficient to effect the desired beneficiation.

A series of examples to show the effectiveness of the method of the invention as applied to the beneficiation of chromite ore were made using a charge comprising 100 parts of ore, containing 30.5% chromium and 19.5% iron (ratio chromium to iron 1.56); 55 parts of anhydrous calcium chloride; and 20 parts of silica. The temperature-time-pressure conditions of each example, together with the improvement in chromium to iron ratio are shown in the table below:

| Example No. | Temperature | Pressure in mm. Mercury | Time of Treatment in Hours | Final Chromium to iron Ratio |
|---|---|---|---|---|
| | °C. | | | |
| 1 | 1,000 | 4.0 | 8 | 3.44 |
| 2 | 1,100 | 4.0 | 8 | 6.15 |
| 3 | 1,100 | 3.0 | 8 | 8.16 |
| 4 | 1,100 | 0.2 | 8 | 17.50 |

From the foregoing data, it is apparent that, by adjusting the pressure and temperature in the treatment of low-grade chromium ore, almost any desired ratio of chromium to iron may be obtained in a relatively short time.

The ferrous chloride formed during the beneficiation treatment may be employed in the regeneration of calcium chloride, which may then be recycled. This is an important feature of the process of the invention since the quantity of calcium chloride consumed is a substantial cost factor.

In regenerating calcium chloride, the condensed anhydrous ferrous chloride is mixed with comminuted limestone and heated in dry air at a temperature of approximately 350° C. until the reaction is complete. The resulting cake is crushed and leached with alcohol, or other appropriate solvent, filtered and the filtrate evaporated to dryness. The calcium chloride so obtained is of high purity and may be used directly in subsequent beneficiation treatments. A high grade iron oxide, suitable for use as a pigment, is obtained by drying the unstable ferrous carbonate residue from the filtration step.

Alternately, the ferrous chloride, formed during benefication of the ore, may be oxidized to ferric chloride and vaporized by heating in dry air at about 350° C. The trichloride of iron so obtained is a product of ready commercial applicability, for example, in sewage treatment, or as a substitute for filter alum in water treatments.

Although the method of the invention has been described in detail only in its application to the benefication of chromium ores, it has been found that it may also be employed in removing iron from many refractory acidic oxides, such as the conversion of titaniferous ores, for example ilmenite ore, to a low-iron titanium product.

The practice of the method of the invention is not limited to any specific design of vacuum furnace. One furnace, however, that has been found to be particularly suitable for the practice of the invention is described in U. S. Patent 2,386,189 issued to Glen D. Bagley.

I claim:

1. Method of beneficiating chromiferous and titaniferous ores which comprises mixing comminuted ore and anhydrous calcium chloride, and heating the mixture so formed to a temperature between 1000° C. and 1200° C. at a pressure of less than 10 mm. mercury absolute to volatilize iron chloride from said ore.

2. A method as claimed in claim 1 in which the mixture of comminuted ore and anhydrous calcium chloride is briquetted prior to heating under reduced pressure.

3. A method as claimed in claim 1 in which silica is added to the mixture of ore and anhydrous calcium chloride to increase the proportion of refractory acidic oxide.

4. Method of beneficiating chromium ore by removing iron therefrom which comprises mixing comminuted chromium ore and anhydrous calcium chloride, and heating the mixture so formed to a temperature between 1000° C. and 1200° C. at a pressure of less than 10 mm. mercury absolute to volatilize iron chloride from said ore.

5. A method as claimed in claim 4 in which the mixture of comminuted chromium ore and anhydrous calcium chloride is briquetted prior to heating under reduced pressure.

6. A method as claimed in claim 4 in which silica is added to the mixture of chromium ore and anhydrous calcium chloride to increase the proportion of refractory acidic oxide.

7. Method of beneficiating low-grade chromite by removing iron therefrom which comprises mixing and briquetting comminuted chromite and anhydrous calcium chloride; charging the briquettes into a vacuum furnace; maintaining the pressure in said furnace between about 0.2 and 4.0 mm. mercury absolute; heating said charge in said furnace to a temperature of about 1100° C. to form and volatilize iron chloride; collecting and forming a condensate of said iron chloride; crushing and mixing said condensate with comminuted limestone; heating the mixture, so formed in air, at about 350° C.; crushing and leaching the products of reaction with alcohol; and evaporating the filtrate to obtain regenerated calcium chloride.

HENDRIK DEW. ERASMUS.

REFERENCES CITED

The following references are of record in the file of this patent:

UNITED STATES PATENTS

| Number | Name | Date |
| --- | --- | --- |
| 702,943 | Guirand | June 24, 1902 |
| 1,392,044 | Booth et al. | Sept. 27, 1921 |
| 2,085,114 | Mitchell | June 29, 1937 |
| 2,183,365 | Booge | Dec. 12, 1939 |
| 2,277,220 | Gailey | Mar. 24, 1942 |